(12) United States Patent
Alferness

(10) Patent No.: US 6,278,959 B1
(45) Date of Patent: Aug. 21, 2001

(54) METHOD AND SYSTEM FOR MONITORING THE PERFORMANCE OF A DATA PROCESSING SYSTEM

(75) Inventor: Merwin Herscher Alferness, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/273,184

(22) Filed: Mar. 19, 1999

(51) Int. Cl.[7] .................................................. G06F 15/00
(52) U.S. Cl. ........................ 702/186; 702/186; 702/182; 711/117; 711/118; 711/122; 712/43; 712/201
(58) Field of Search .................................... 702/186, 182; 700/169, 174; 711/117, 118, 122

(56) References Cited

U.S. PATENT DOCUMENTS 4,814,978 * 3/1989 Dennis ................................ 712/201
5,483,468 * 1/1996 Chen et al. ........................ 702/186
5,724,599 * 3/1998 Balmer et al. ...................... 712/43
5,956,744 * 9/1999 Robertson et al. ................. 711/122
5,960,461 * 9/1999 Frank et al. ........................ 711/163

* cited by examiner

Primary Examiner—Arthur T. Grimley
Assistant Examiner—Mohamed Charioui
(74) Attorney, Agent, or Firm—Bracewell & Patterson L.L.P.

(57) ABSTRACT

A data processing system and method of monitoring the performance of a data processing system in processing data requests, where said data processing system processes data requests within a multilevel memory hierarchy. At least one token is passed with a data request along a particular path within the multilevel memory hierarchy. The time duration for the token to completely pass along the particular path is stored if expected conditions are encountered along the particular path within the multilevel memory hierarchy, such that the performance of said data processing system requesting data along that particular path under the expected conditions is determined and is available for subsequent performance monitoring.

46 Claims, 14 Drawing Sheets

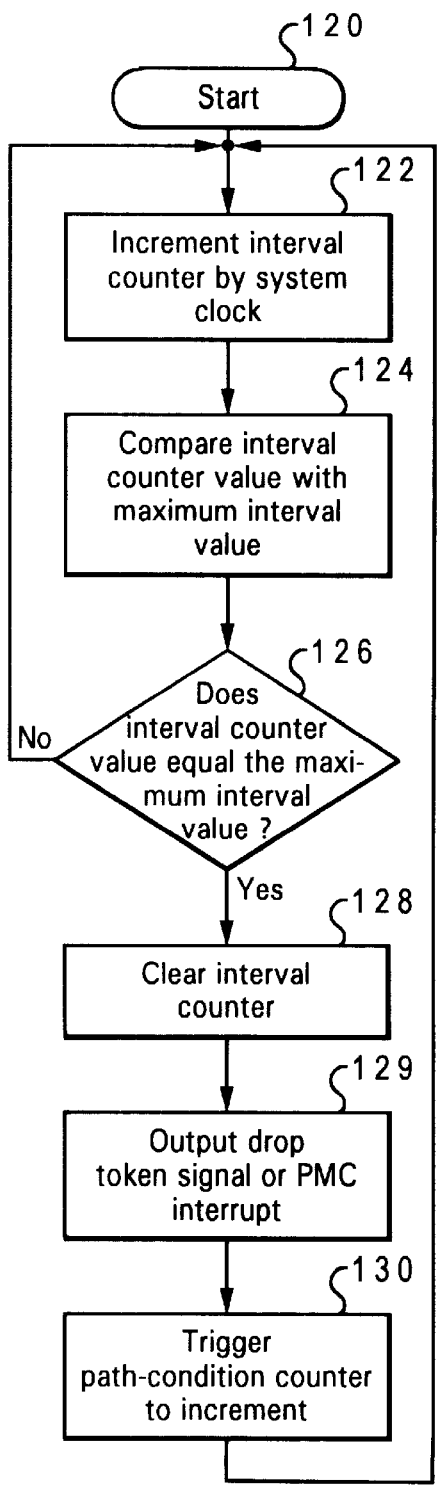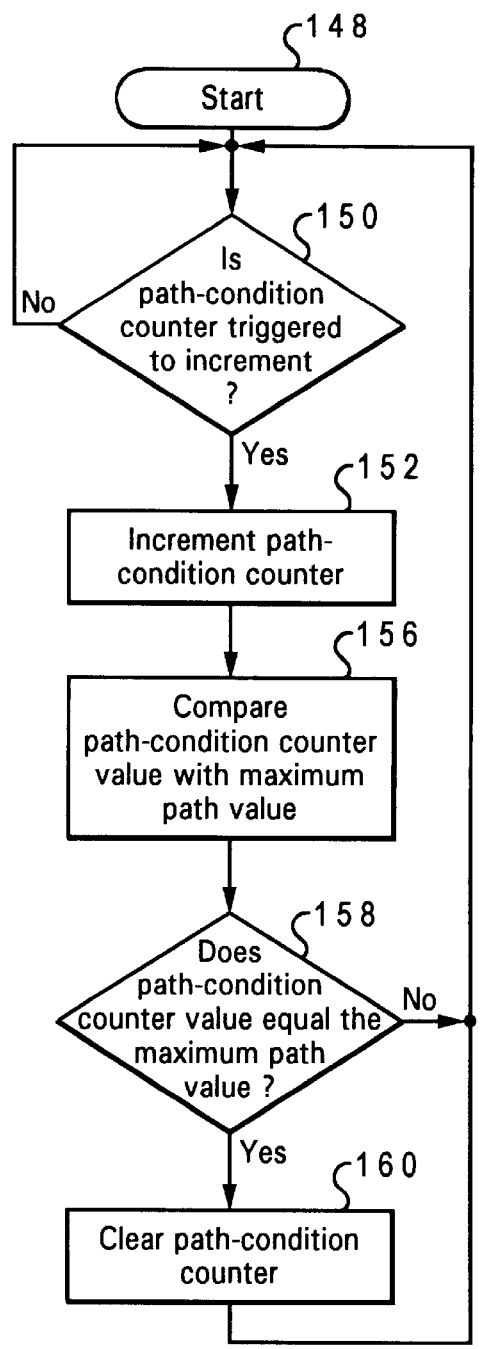
Fig. 5A
Fig. 5B

METHOD AND SYSTEM FOR MONITORING THE PERFORMANCE OF A DATA PROCESSING SYSTEM

BACKGROUND OF THE INVENTION

1. Field of the Invention

The present invention relates in general to an improved data processing system and method and in particular to an improved data processing system and method for monitoring the performance of a data processing system. Still more particularly, the present invention relates to an improved method and system for measuring the latency of data requests within a data processing system.

2. Description of the Related Art

It is well-known in the computer arts that greater computer system performance can be achieved by harnessing the processing power of multiple individual processors in tandem. Multi-processor (MP) computer systems can be designed with a number of different topologies, of which various ones may be better suited for particular applications depending upon the performance requirements and software environment of each application. One of the most common MP computer topologies is a symmetric multi-processor (SMP) configuration in which multiple processors share common resources, such as a system memory and input/output (I/O) subsystem, which are typically coupled to a shared system interconnect. Such computer systems are said to be symmetric because all processors in a SMP computer system ideally have the same access latency with respect to data stored in the shared system memory.

Although SMP computer systems permit the use of relatively simple inter-processor communication and data sharing methodologies, SMP computer systems have limited scalability. As a result, an MP computer system topology known as non-uniform memory access (NUMA) has emerged as an alternative design that addresses many of the limitations of SMP computer systems at the expense of some additional complexity. A typical NUMA computer system includes a number of interconnected nodes that each include one or more processors and a local "system" memory.

Such computer systems are said to have a non-uniform memory access because each processor has lower access latency with respect to data stored in the system memory at its local node than with respect to data stored in the system memory at a remote node. NUMA systems can be further classified as either non-coherent or cache coherent, depending upon whether or not data coherency is maintained between caches in different nodes.

The complexity of cache coherent NUMA (CC-NUMA) system is attributable in large measure to the additional communication required for hardware to maintain data coherency not only between the various levels of cache memory and system memory within each node but also between cache and system memories in different nodes. NUMA computer systems do; however, address the scalability limitation of conventional SMP computer systems, since each node within a NUMA computer system can be implemented as a smaller SMP system. Thus, the shared components within each node can be optimized for use by only a few processors, while the overall system benefits from the availability of larger scale parallelism while maintaining relatively low latency.

Measuring the latency associated with data requests within data processing systems, such as an MP computer system, is important to monitor the performance of a data processing system. However, gathering performance data for MP computer systems, such as NUMA computer systems, is typically limited because a data request may be satisfied by one of several levels of cache or else by memory. In addition, frequently, data requests pass through multiple chips within a NUMA computer system before data is returned. Moreover, logical partitioning of processors and data storage areas of data processing systems complicates measuring performance. Even within a single processor system, a processor can access data from multiple levels of cache and memory where measuring the latency of each data request to each level is difficult Moreover, it is typically not stipulated that two data requests to the same level of cache will encounter the same set of conditions for each request, where conditions along a data path to capture requested data typically affect the latency of the data path.

There is a need for a system wide performance method which will provide an overview of the data processing system performance for single and multiprocessor data processing systems which access data from a memory hierarchy. Further, there is a need to measure the performance of particular data request events within a data processing system.

SUMMARY OF THE INVENTION

It is therefore one object of the present invention to provide an improved data processing system and method.

It is another object of the present invention to provide an improved data processing system and method for monitoring the performance of a data processing system.

It is yet another object of the present invention to provide an improved method and system for measuring the latency of data requests within a data processing system.

The foregoing objects are achieved as is now described. A data processing system and method of monitoring the performance of a data processing system in processing data requests, where said data processing system processes data requests within a multilevel memory hierarchy are provided. At least one token is passed with a data request along a particular path within the multilevel memory hierarchy. The time duration for the token to completely pass along the particular path is stored if expected conditions are encountered along the particular path within the multilevel memory hierarchy, such that the performance of said data processing system requesting data along that particular path under the expected conditions is determined and may be utilized for subsequent performance monitoring.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

FIG. 5 is a high level logic flowchart illustrating a iterative processes executed within the token enable logic illustrated in FIG. 4;

DESCRIPTION OF THE PREFERRED EMBODIMENT

System Overview

Figure 1:
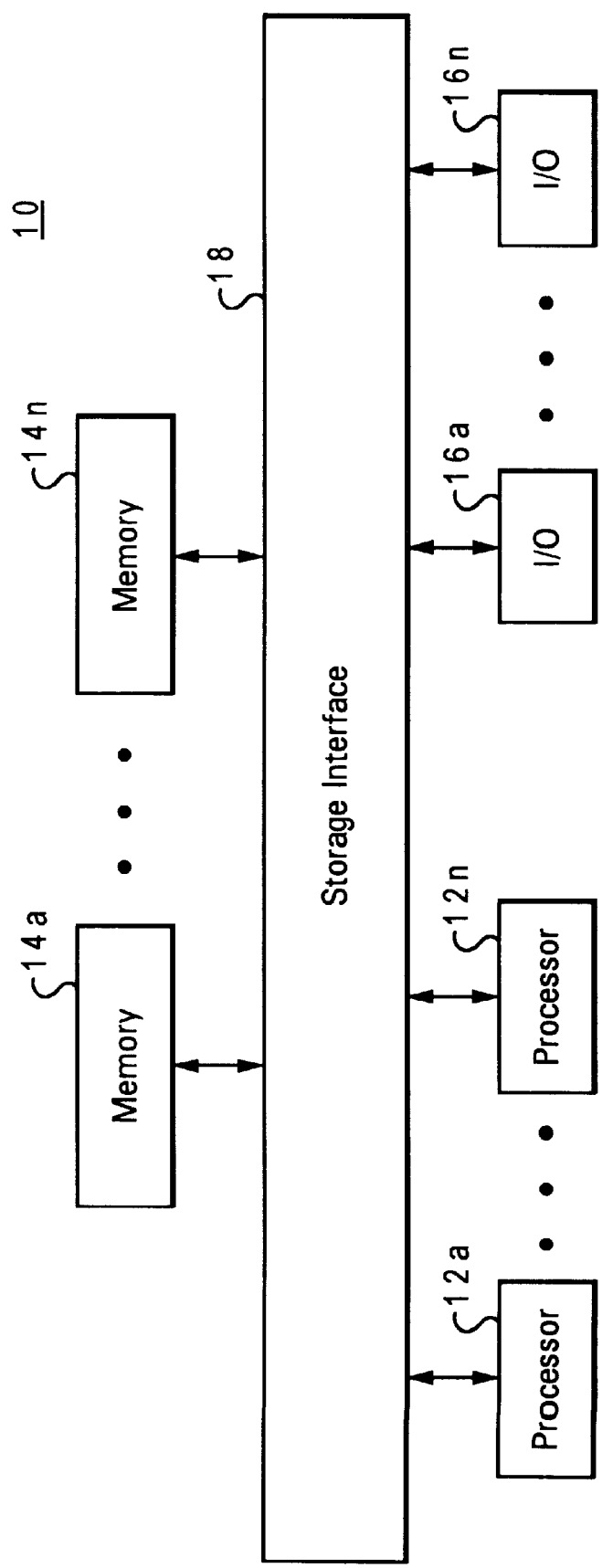
FIG. 1 illustrates a block diagram representation of a data processing system that can be utilized to implement the present invention.

Referring now to the figures and in particular with reference to FIG. 1, there is illustrated a block diagram representation of a data processing system 10, which utilizes an operating system and can be utilized to implement the present invention. Data processing system 10 is preferably a server which utilizes a multi-processor architecture to process data, however data processing system 10 may also utilize a single-processor architecture. Data processing system 10 includes processors 12*a*14 12*n*, memory units 12*a*–12*n*, I/O controllers 16*a*–16*n* and a storage interface 18 between processors 12*a*–12*n*, memory units 14*a*–14*n* and I/O controllers 16*a*–16*n*. I/O controllers 16*a*–16*n* provide an interface for I/O devices such as data storage systems and communications links. In addition, I/O controllers 16*a*–16*n* provide an interface for peripherals such as keyboards, mouse and video display systems which provide user input/output of data processing system 10. In addition, I/O controllers 16*a*–16*n* provide an interface for data storage devices.

Figure 2:
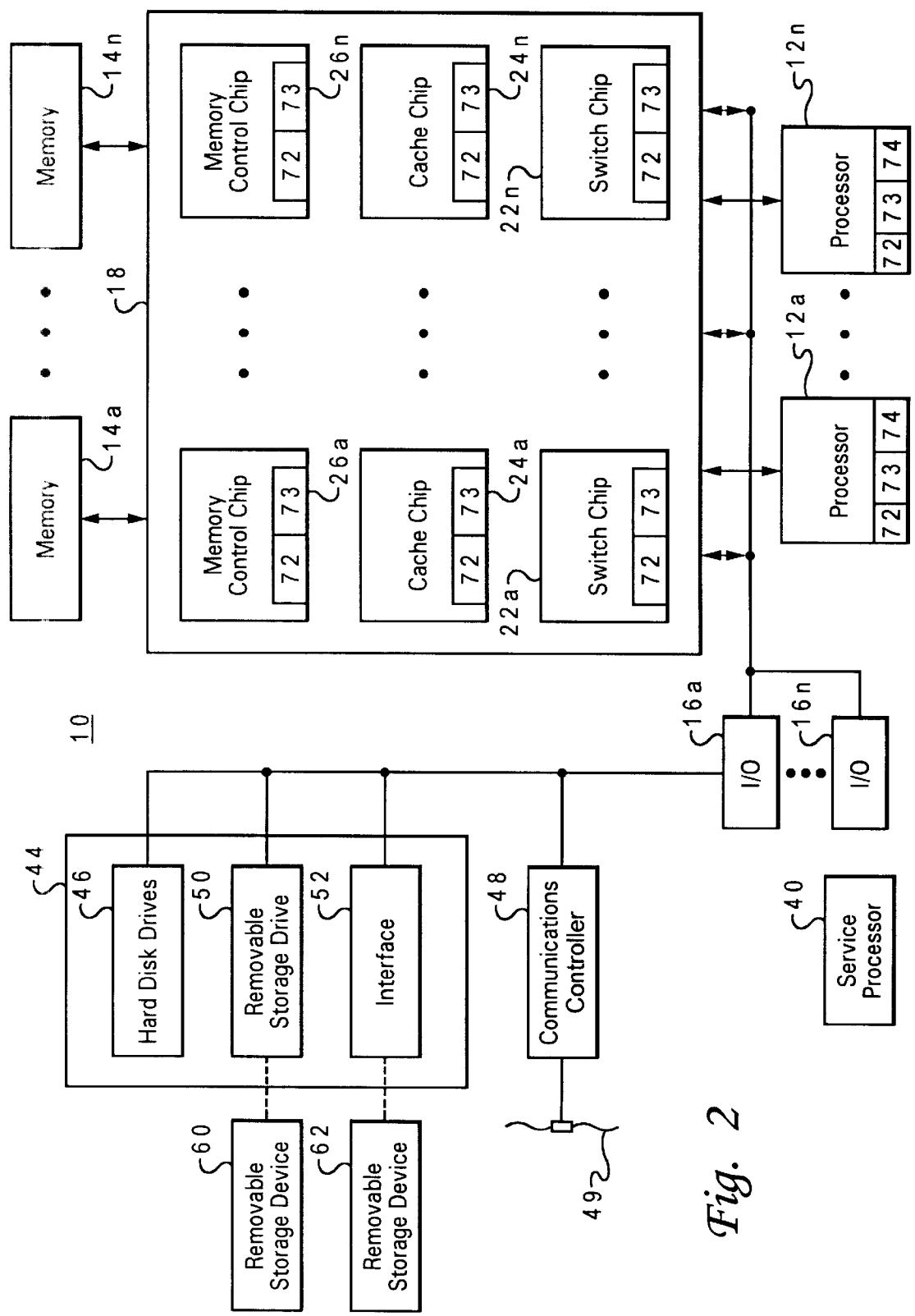
FIG. 2 depicts a more detailed block diagram representation of the data processing system illustrated in FIG. 1.

With reference now to the figures and in particular with reference to FIG. 2, there is depicted a more detailed block diagram representation of the data processing system illustrated in FIG. 1. After reading the description, it will be apparent to a person skilled in the relevant art how to implement the invention using other data processing systems and/or data processing system architectures.

As described in FIG. 1, data processing system 10 also includes memory units 12*a*–12*n*, which preferably include read only memory (ROM), random access memory (RAM), and other known memory types. Multiple routines are typically stored in ROM where each routine typically contains multiple processor steps. Each routine may also be represented as a function to be performed on data or an execution step. Within RAM, an operating system, having application programs incorporated, operates. As will be appreciated by those skilled in the art, memory units 14*a*–14*n* comprise a number of individual volatile memory modules which store segments of operational system, application software and other data while power is supplied to data processing system 10.

Within storage interface 18, multiple levels of cache are provided through switch chips 22*a*–22*n*, cache chips 24*a*–24*n* and memory control chips 26*a*–26*n*, wherein a multilevel hierarchy of cache units is provided. In addition, while not depicted, in some processors 12*a*–12*n*, cache and/or memory may be integrated with the processor unit. Data from memory units 12*a*–12*n*, secondary memory 44, processors 12*a*–12*n* and other data sources is buffered within cache of storage interface 18. Thereby, a multilevel memory hierarchy is provided by storage interface 18, memory units 12*a*–12*n*, secondary memory 44, processors 12*a*–12*n* and other data sources of data processing system 10 where processors 12*a*–12*n* typically control the processing of the data within the multilevel memory hierarchy.

Overall, a performance controller for monitoring the performance of data processing system 10 may be implemented by including a token enable logic unit 72 and token passing logic unit 73 in each component of the multilevel memory hierarchy and in particular within each of processors 12*a*–12*n* and cache units within storage interface 18. In addition, each of processors 12*a*–12*n* includes an event counter and timer logic unit 74 for performance monitoring. An additional input/output pin is provided with each token enable logic unit 72 for passing a token with a data request as will be further described. Although not depicted, as previously described, it may be preferable to include token enable logic unit 72 and token passing logic unit 73 within other components of data processing system 10 including I/O controllers 16*a*–16*n* and I/O devices interfaced thereto including secondary memory 44.

The performance controller may also include storage set apart for performance monitor counter (PMC) values within memory units 14*a*–14*n*. The PMC values may be further processed by data processing system 10 to provide statistical data about the data request events and latency thereof.

Secondary memory 44 may also be included in data processing system 10. Secondary memory 44 includes, for example, multiple hard disk drives 46, a removable storage drive 50, and an interface 52. Removable storage drive 50 may represent a floppy disk drive, magnetic tape drive, an optical disc drive, or other data drive which reads and writes to a removable storage device 60. Removable storage device 60 represents a floppy disk, magnetic tape, optical disk, or any other data storage device which is read by and written to by removable storage drive 50. As will be appreciated by one skilled in the art, removable storage device 60 includes a computer usable storage medium having stored therein computer software and/or data.

In alternative embodiments, secondary memory 44 may include other similar means for allowing computer programs, or other instructions to be loaded into data processing system 10. Such means may include, for example, a removable storage device 62 and interface 52. Examples may include a program cartridge and cartridge interface, a removable chip (such as EEPROM, PROM, or PCMCIA) and associated socket, and other removable storage devices 62 and interfaces 52 which allow software and data to be transferred from removable storage device 62 to data processing system 10.

Data processing system 10 may also include a communications controller 48. Communications controller 48 allows software and data to be transferred between data processing system 10 and external devices via communications path 49 which typically comprises an Ethernet link. Examples of communications controller 48 include a modem, printer, communications port, and other communications supporting hardware. Software and data transferred via communications controller 48 are in the form of signals that can be electronic, electromagnetic, optical, or other signals capable of being received or sent by communications controller 48 via communications path 49. In particular, communications controller 48 provides a means by which data processing system 10 may interface a network such as a local area network (LAN) or the Internet.

A service processor 40 is also included within data processing system 10. In particular, service processor 40 controls the diagnostic management of data processing system 10. Preferably, service processor 40 is an integrated subsystem solution independent of the hardware and operating system, complementing the hardware by monitoring, logging events and reporting on operating conditions within data processing system 10. In the present invention, service processor 40 may access memory units 14a–14n to retrieve and process performance data for data processing system 10. Typically, service processor 40 is implemented in servers and other large data processing systems, however may also be implemented within a workstation or laptop computer.

The present invention is preferably implemented utilizing software and hardware executing in a data processing system environment similar to that described above with respect to FIG. 2. Thus, the term "computer program product" is used to generally refer to a program stored at removable storage drive 50 or the hard disk installed in hard disk drive 46. These computer program products provide application software to data processing system 10 which may direct the operating system to utilize multiple processors 12 to perform programmed functions.

Computer programs or computer control logic are preferably stored in memory 14a–14n and/or secondary memory 44. Computer programs or computer control logic can also be received via communications interface 48. In particular, computer programs or computer control logic may be utilized to control each token enable logic unit 72, token passing logic unit 73 and event counter and timer logic unit 74. In addition, computer programs or computer control logic may also be utilized to process and store data provided by token enable logic unit 74 and event timer and counters logic unit 73. Moreover, other functions may also be provided by computer programs or computer control logic to implement the present invention. Such computer programs, when executed, enable data processing system 10 to perform the features of the present invention as discussed herein. Accordingly, such computer programs represent controllers of data processing system 10.

Performance Monitoring Overview

Figure 3:
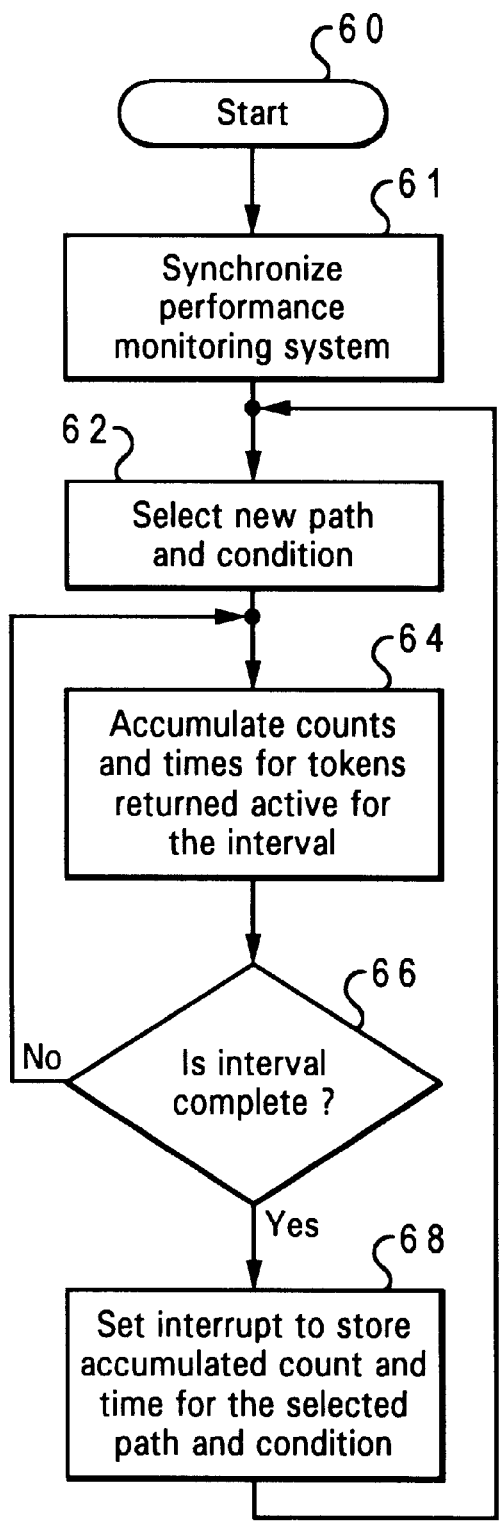
FIG. 3 is a high level logic flowchart illustrating a process for monitoring the performance of a data processing system according to the method of the present invention.

Referring now to FIG. 3, there is depicted a high level logic flowchart of the process for monitoring performance of a data processing system according to the method of the present invention. The flowchart illustrates the steps taken by the performance monitoring system. As will be later illustrated, the timing and order of particular steps is dependent upon processor steps and interval interrupts. As depicted, the process starts at block 60 and thereafter proceeds to block 61. Block 61 illustrates the synchronization of the performance monitoring system including synchronization of counters and timers within each token enable logic unit 72 and each event counter and timer logic unit 74.

Thereafter, block 62 depicts the selection of a path and condition within each token enable logic unit 72. Since the logic units are synchronized, the same path and condition should be selected in each token enable logic unit 72. Next, block 64 illustrates the accumulation of counts and times for tokens returned active in the interval. Multiple processors may send requests within a single interval. Corresponding, multiple data requests may be sent by each of those processors within a single interval and a timer started for each request. Only those data requests sent along the selected path where the selected conditions are present will return with an active token. For each token returned active, the total time for the token to be sent and returned is accumulated and the token is counted.

Thereafter, block 66 depicts a determination of whether or not the interval is complete. If the interval is not complete, the process proceeds to block 64 and continues to accumulate counts and times for the interval. If the interval is complete, the process passes to block 68. Block 68 illustrates setting an interrupt to store the accumulated count and time for the selected path and condition whereafter the process returns to block 62 and a new path and condition for the interval are selected. The interrupt set at block 68 triggers the same process depicted in FIG. 12 which will be further described below. In addition to accumulating the time taken for tokens to be returned, other data, such as the instruction address and data address of the data request associated with the token, may also be captured and stored.

Token Enable Logic

Figure 4:
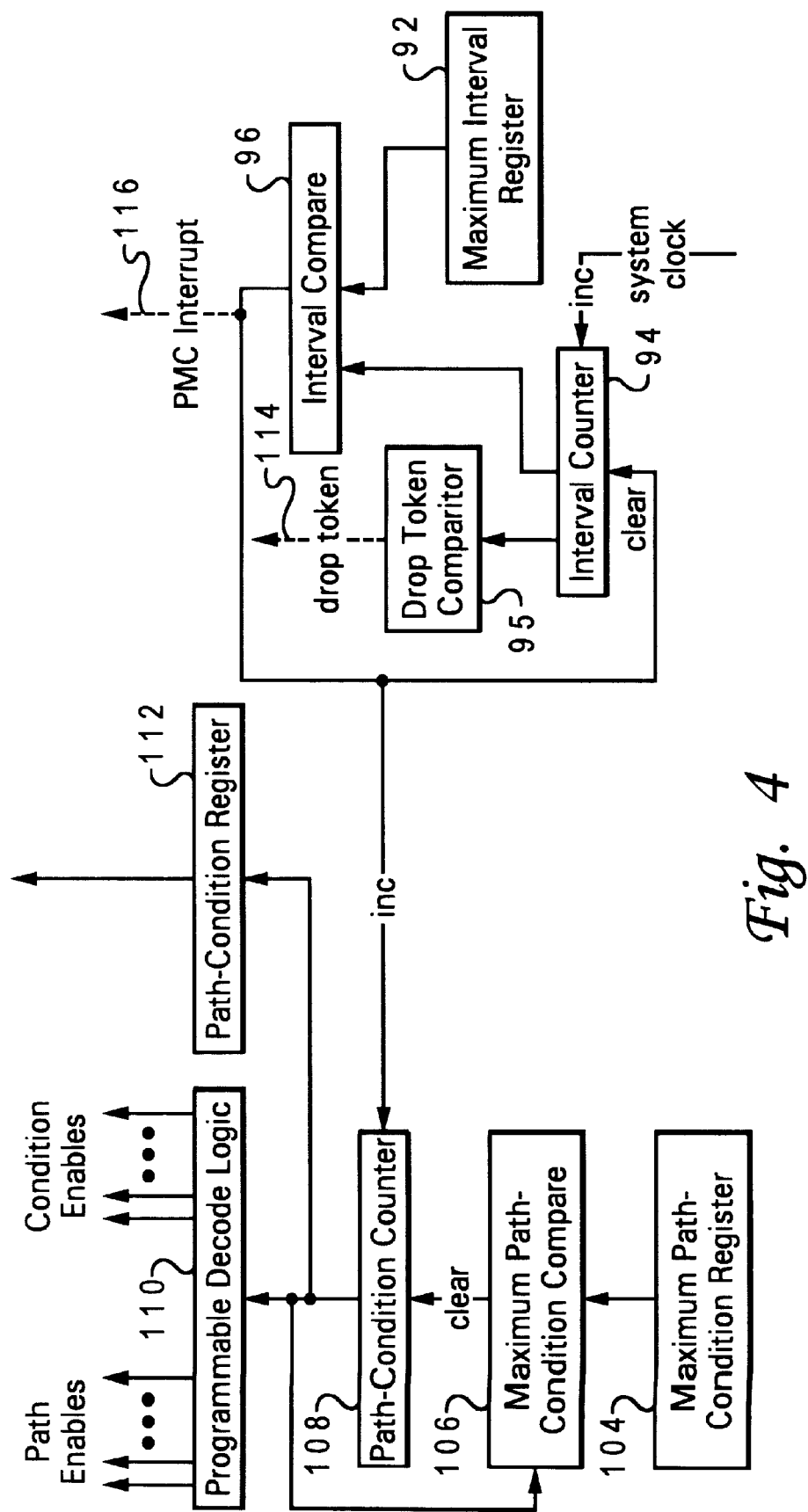
FIG. 4 depicts a detailed block diagram representation of the token enable logic of the data processing system as illustrated in FIG. 2.

With reference now to FIG. 4, there is illustrated a block diagram representation of token enable logic unit 72. Token enable logic unit 72 is preferably included within each processor and each cache unit of the storage interface. In addition, token enable logic unit 72 may be included within other data storage devices accompanying data processing system 10. At system initialization, the values stored within a maximum interval register 92 and a maximum path register 104 are initialized to the same values within each token enable logic unit 72 by a scanning method as is well known in the art. In addition, at system initialization, each token enable logic unit 72 initially operates in a synchronization mode during which counters may be initialized as will be further described.

As depicted in FIG. 4, maximum interval register 92 contains a value which determines the length of each time interval during which data is gathered or the limit thereof. During operation in normal mode, the maximum interval register is compared, by interval compare 96, with an interval counter value from interval counter 94. Interval counter 94 is continually incremented by the system clock. In the present invention, interval counter 94 is preferably a 24-bit counter where the 24 bits of interval counter 94 are compared with the 24 bit maximum interval register 92, however in alternate embodiments may utilize any multiple of bits preferable for the embodiment. The top 18 bits of interval counter 94 are compared with zero by drop token comparitor 95. When the top 18 bits of interval counter 94 are zero, the comparitor outputs a drop token signal.

When the interval counter value equals the maximum interval register, then interval compare 96 outputs a signal which clears interval counter 94 and outputs other signals. One such signal is performance monitor counter (PMC) interrupt 116 which is output only within processor components and utilized internally within the processor to enable storage of data as will be further described. Another such signal output from interval compare 96, enables path-condition counter 108 to increment to the next path and/or condition.

Maximum path-condition register 104 contains a value which determines the maximum number of paths and conditions to be monitored or the limit thereof. Maximum path-condition register 104 is compared, by maximum path-condition compare 106, with path-condition counter 108. When path-condition counter 108 equals maximum path-condition register 104, maximum path-condition compare 106 outputs a signal that clears path-condition counter 108.

Each token enable logic unit 72 within a processor outputs a path-condition counter signal from path-condition counter 108, which is stored in path-condition register 112 at the end of each interval. Alternatively, each token enable logic unit 72 within a non-processor chip preferably includes a programmable decode logic unit 110. The path-condition counter signal is decoded by programmable decode logic unit 110 to determine the selected path and conditions. In alternate embodiments, fixed decode logic may also be utilized.

The programming of each path decoder 110 may be unique for each token enable logic unit 72. For example, if a path-condition counter value of 2 is set by a first token enable logic unit 72, the token path decoder 110 would select a path leading toward a another storage control chip. However, in another token enable logic 72, a path-condition counter value of 2 may select a path leading toward the next cache level memory chip. In addition, the same path may be represented by path-condition counter values 1,2,3,4 and 5, however each of the path-condition counter values represents a different condition for the path.

Through the settings in programmable decode logic unit 110, multiple types of conditions may be monitored in order to gain performance data for various parts of the system. For example, one set of conditions may test the current condition of a queue associated with a cache where each data request for the cache waits in the queue to be processed. A set of conditions for the cache path may include an empty queue, a queue ⅓ full, a queue ⅔ full and a queue completely full. Alternately, only the empty queue condition may be tested for to time the fastest path.

Referring now to FIG. 5, there is illustrated a high level logic flowchart depicting iterative processes executed within token enable logic unit 72 of FIG. 4. Each process represents the functions performed by different functional blocks within token enable logic unit 72. The first iterative process depicted starts at block 120 and proceeds to block 122. Block 122 depicts incrementing the interval counter by the system clock. Next, block 124 illustrates the comparison of the interval counter with the maximum interval register. Thereafter, block 126 depicts the determination of whether or not the interval counter equals the maximum interval register. If the interval counter equals the maximum interval register, the process proceeds to block 128. However, if the interval counter is less than the maximum interval register, the processor returns to block 122. Block 128 illustrates clearing the interval counter. Thereafter, block 129 depicts the output of a PMC interrupt signal in processors. Next, block 130 depicts triggering the path select counter to increment whereafter the process passes back to block 122.

The second iterative process depicted starts at block 148 and passes to block 150. Block 150 illustrates the determination of whether or not the path-condition counter is triggered to increment. As previously depicted, block 130 of the first iterative process triggers the path-condition counter to increment. The process iterates at block 150 until the path trigger event occurs, whereafter the process proceeds to block 152. Block 152 illustrates incrementing the path-condition counter. Thereafter, block 156 illustrates the comparison of the path-condition counter with the maximum path-condition register. Block 158 depicts the determination of whether or not the path-condition counter equals the maximum path-condition register. If the path-condition counter does not equal the maximum path-condition register, the process returns to block 150. If the path-condition counter is equal, the process proceeds to block 160. Block 160 illustrates clearing the path-condition counter, whereafter the process returns to block 150.

Figure 13:
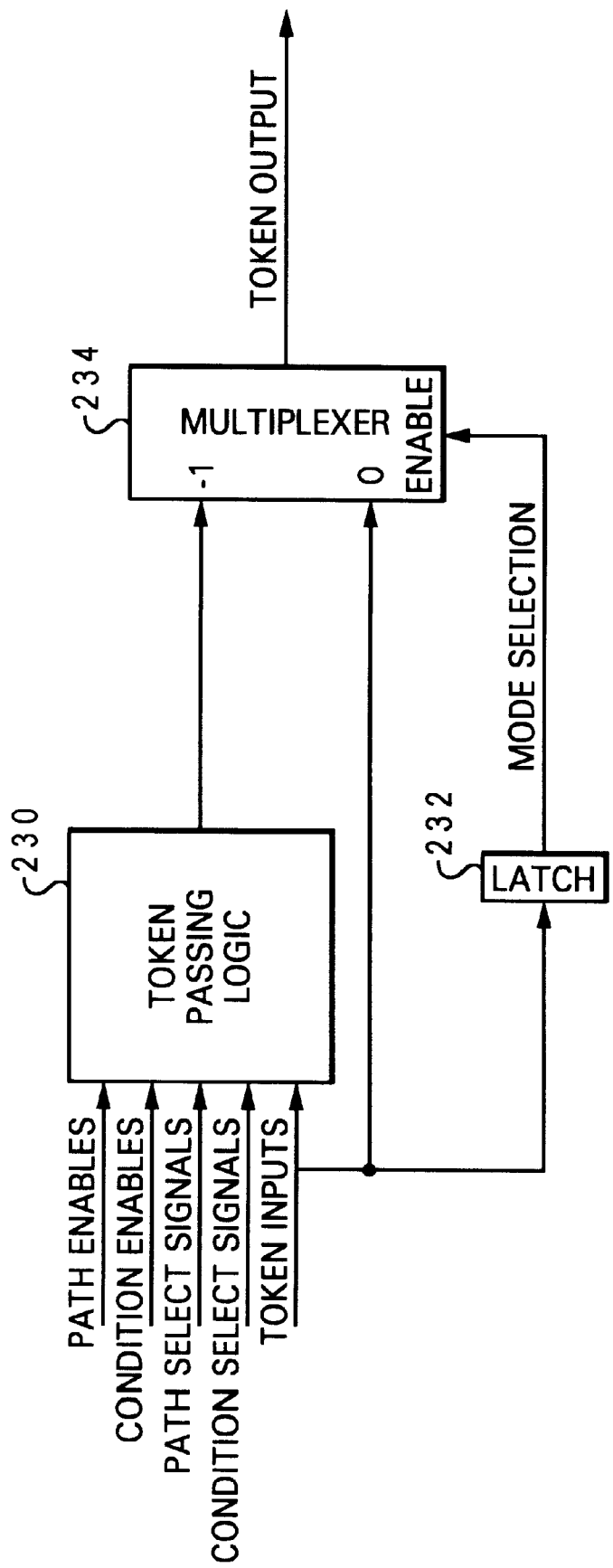
FIG. 13 illustrates a block diagram representation of logic utilized to control passing of a token dependent upon the path and condition enabled in token enable logic 72.

With reference now to FIG. 13, there is depicted a block diagram representation of logic utilized to control passing of a token dependent upon the path and condition enabled in token enable logic 72. Multiple inputs directed to token passing logic 73 include path enables, condition enables, token inputs, path select signals and condition select signals. The path enables and condition enables are determined by token enable logic 72. The token is received as either active "1" or dropped "0" from the previous chip. The path select signals and condition select signals indicate the path and conditions present in each component.

In token passing logic 73, if the enabled path and condition are equivalent to the path and conditions present within the chip and the received token is active, the active token is passed from token passing logic 73. However, if the enabled path and conditions are not equivalent, then the token is dropped. A multiplexer 234 is set to output tokens with the data to which the token is attached. In synchronization mode, as will be further described, the token received is passed from multiplexer 234 as the token output. However, in normal operating mode, the token determined by token passing logic 73 is passed from multiplexer 234 as the token output.

Figure 6:
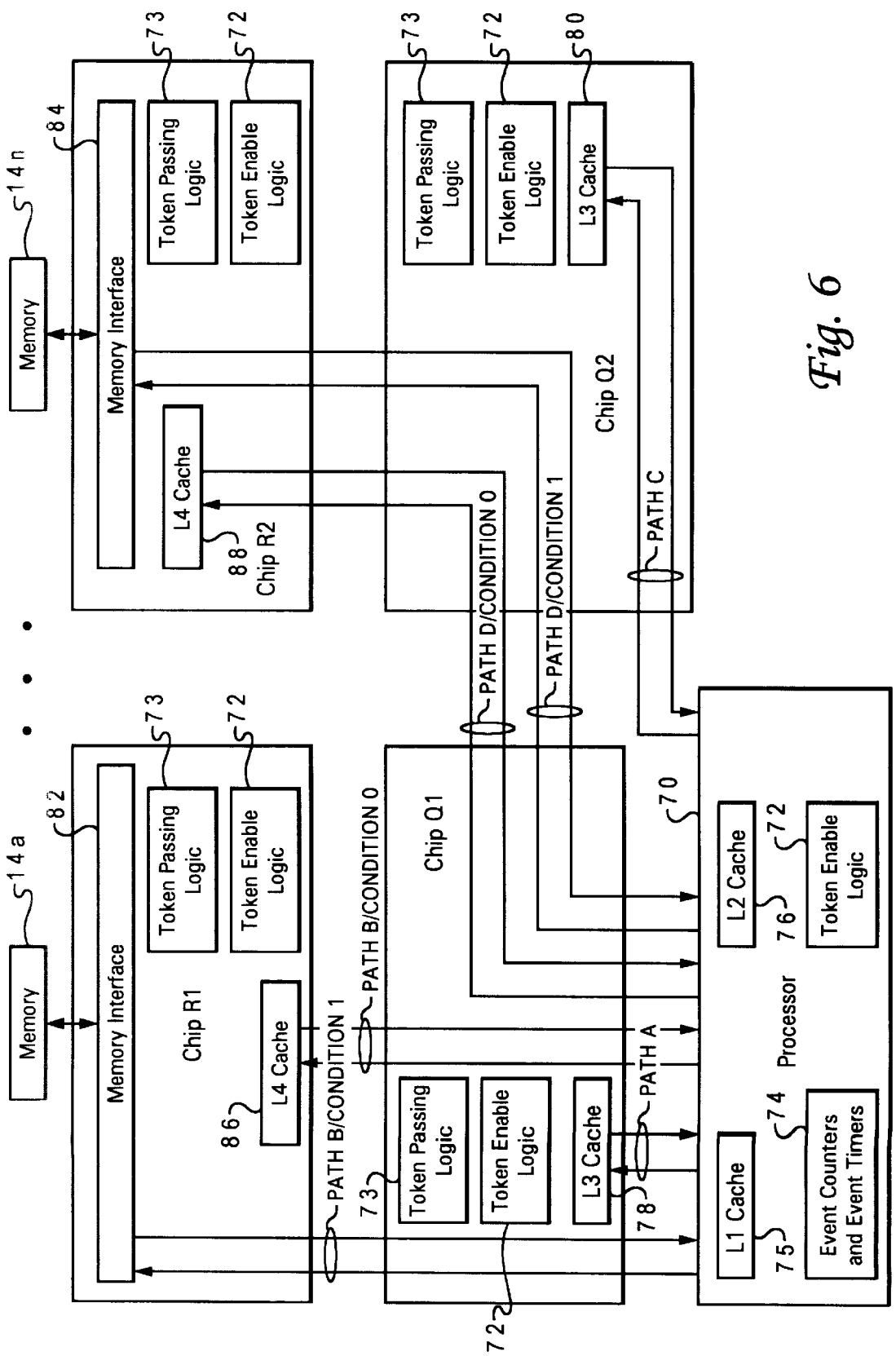
FIG. 6 depicts a detailed block diagram representation illustrating an example of a set of multiple paths and conditions along which a token may be passed from a processor.

With reference now to FIG. 6, there is depicted a block diagram representation illustrating an example of a set of multiple paths and conditions along which a token may be passed from a processor in accessing data from the cache hierarchy and/or from memory. In alternate embodiments, additional processor to memory systems may be utilized where paths for each processor may overlap. In addition, processor to memory systems may be included which contain paths through processors and to I/O devices.

As depicted in FIG. 6, processor 70 includes token enable logic unit 72, event counters and timers unit 74, L1 cache 75, and L2 cache 76. In addition, processor 70 may contain token passing logic 73. L1 cache 75 and L2 cache 76 are associated with processor 70. The latency of data requests to L1 cache 75 and L2 cache 76 can be measured and monitored by several well known techniques, however may also utilize the monitoring technique described herein.

Four chips illustrated in the example containing cache include path switch controller chip Q1, path switch controller chip Q2, memory controller chip R1 and memory controller chip R2. Each of the chips Q1, Q2, R1, and R2 also contain token enable logic 72 and token passing logic 73. Specifically, chip Q1 contains L3 cache 78 and chip Q2 contains L3 cache 80. In addition, chip R1 contains L4 cache 86 and memory interface 82 and chip R2 contains L4 cache 88 and memory interface 84. Data on chips Q1, Q2, R1 and R2 may be accessed by multiple processor units in addition to processor 70 illustrated in the example.

Multiple paths are illustrated from processor 70 to each of the chips Q1, Q2, R1, and R2. Path A is illustrated connecting processor 70 to L3 cache 78 of chip Q1. Path B is depicted connecting processor 70 with L4 cache 86 and memory interface 82 through chip Q1. In reality, preferably one physical path relays between processor 70 and chip R1, however, for the purposes of illustration, multiple paths are shown when more than one condition is being tested. Path B is directed to L4 cache 86 when a decoded condition enable value is "0". However, path B is directed to memory interface 82 when a decoded condition enable value is "1". Chip Q1 is responsible for passing the token along path B.

Path C passes through chip Q1 to L3 cache 80 in chip Q2. Following, path D passes through both chips Q1 and Q2 to L4 cache 88 and memory interface 84. For a decoded condition enable value of "0", path D is directed to L4 cache 88 and for a decoded condition enable value of "1", path D is directed to memory interface 84. For both paths B and D, the decoded condition enable value of "0" is met if there is a cache hit and the decoded conditional enable value of "1" is met if there is a cache miss whereby an associated memory is accessed through the memory interface for the requested data.

Figure 7:
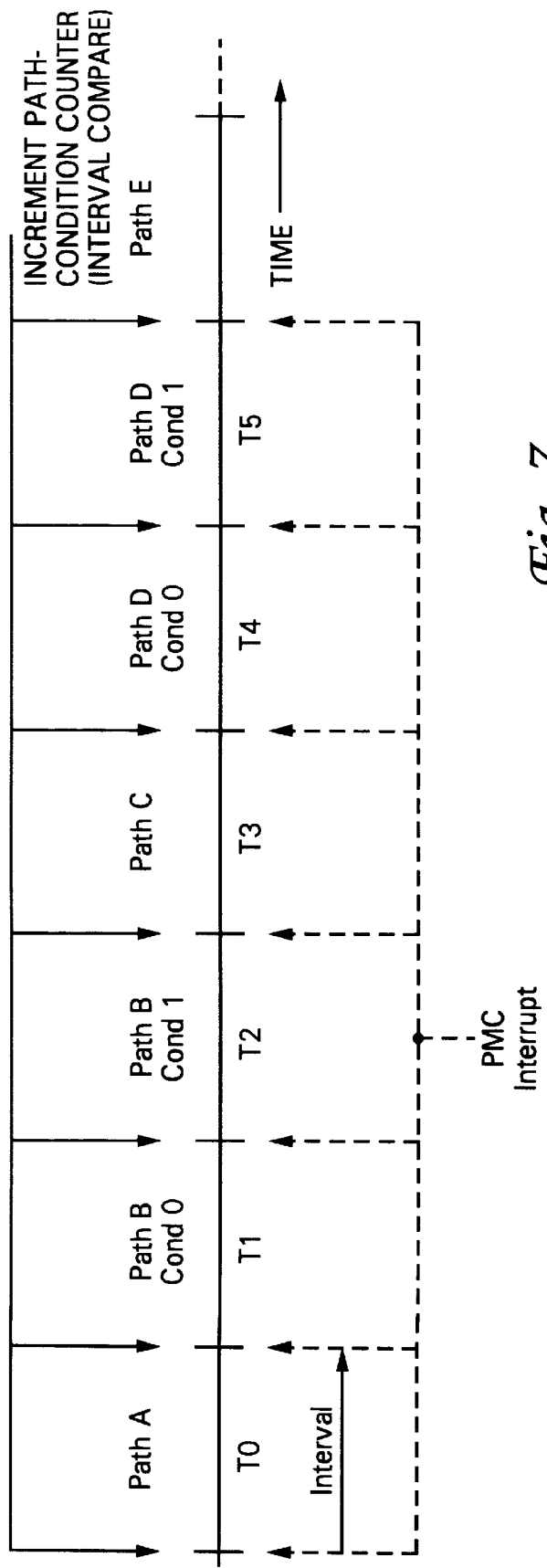
FIG. 7 illustrates a timing diagram representation for the example illustrated in FIG. 6 according to the method and system of the present invention.

Referring now to FIG. 7, there is illustrated a timing diagram for the example depicted in FIG. 6 according to the method and system for the present invention. Intervals T0, T1, T2, T3, T4 and T5 are depicted where each interval is determined by a PMC interrupt generated by token enable logic unit 72. For each time interval, the path and condition decoded within each token enable logic unit 72 is illustrated. For example, during,time interval T0, each token enable logic unit 72 is set to path A. Multiple data requests and token signals are sent during time interval T0, however, each token passing logic unit 73 is set to transfer active token signals for data requests which are passed along path A. Any data requests not passed along path A will have the token signals associated therewith dropped. Therefore, any active token signals received at processor 70 during time interval T0 have been returned with data requests along path A.

In another example, during time interval T1, each token enable logic unit 72 is set to path B, enabled condition "0". For path B and enabled condition "0" to be true, a cache hit for requested data must occur in L4 cache of chip R1. Alternatively, for time interval T2, each token enable logic unit 72 is set to path B, enabled condition "1". For path B and enabled condition "1" to be true, a cache miss occurs at L4 cache 86 of chip R1, meaning the data is retrieved through memory interface 82 rather than L4 cache 86.

Further, during time interval T3, each token enable logic unit 72 is set to path C. For tokens to remain active during time interval T3, the data request that the token is attached to must travel to L3 cache 80. Next, during time interval T4, each token enable logic unit is set to path D, enabled condition "0". Tokens returning active during time interval T4 pass through chips Q1 and Q2 and meet a cache hit at L4 cache 88 of chip R2. Thereafter, during time interval T5, the token enable logic unit is set to path D, enabled condition "1". Tokens returning active during time interval T5 pass through chips Q1 and Q2, meet a cache miss of L4 cache 88 and retrieve the requested data from memory interface 84.

Event Counters and Timers

Figure 8:
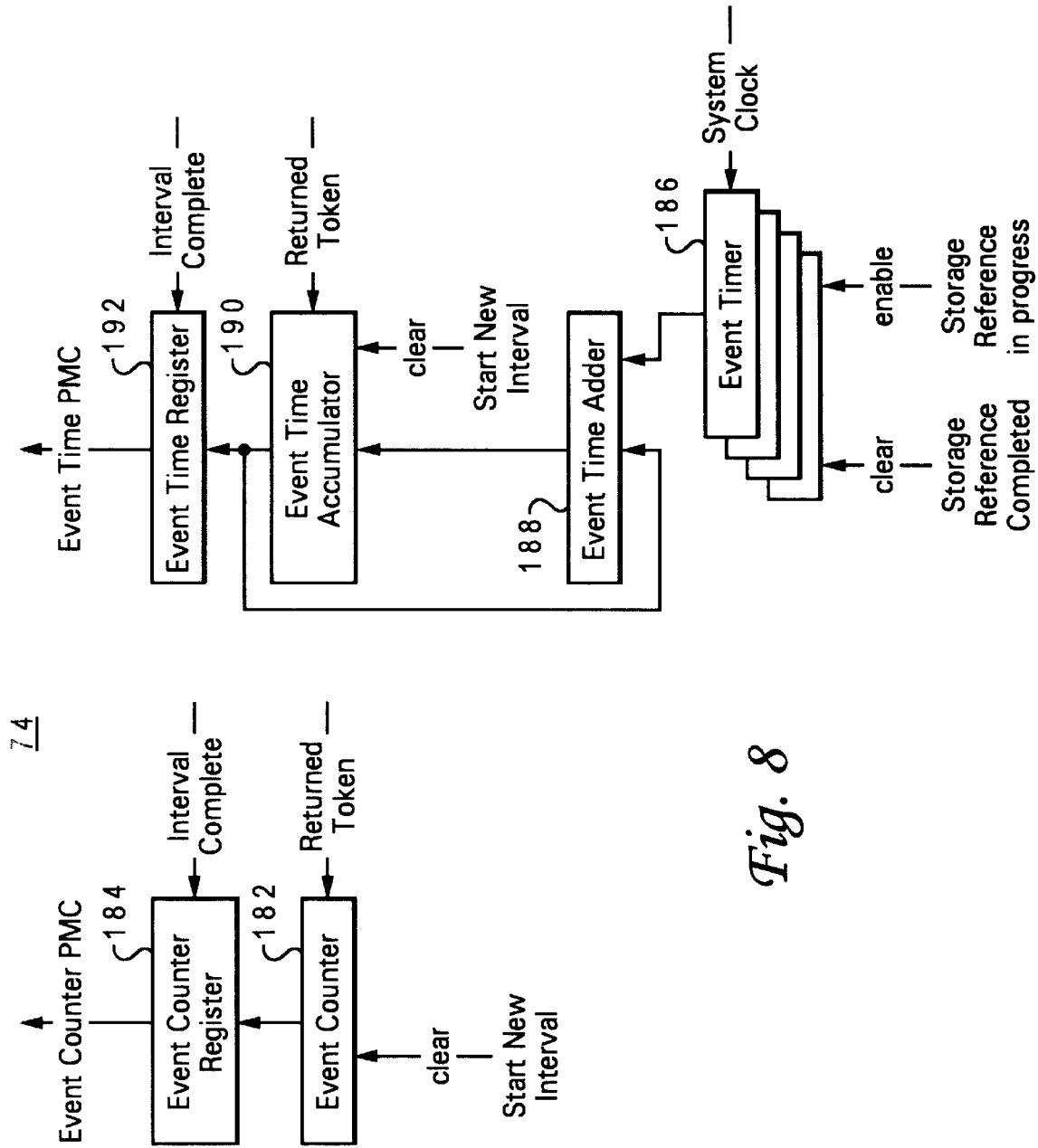
FIG. 8 depicts a more detailed block diagram representation of event timer and counter logic preferably included within each processor of a data processing system.

With reference now to FIG. 8, there is illustrated a more detailed block diagram representation of event counter and timer logic unit 74, preferably included within each processor of data processing system 10. Event counter 182 is incremented for each returned active token signal. An active token signal is returned only if all the expected conditions were met for the particular path chosen within token enable logic 72. Upon completion of an interval, an event counter register 184 is enabled to hold the event counter value. The event counter register 184 value is passed to the event count PMC, to be further described. Upon the start of a new interval, the event counter is cleared.

Event timer 186 includes multiple event timers because multiple outstanding storage requests may exist at one time. Each event timer 186 is enabled to increment by the system clock when a data storage reference for the particular event timer 186 is in progress. In addition, each event timer 186 is cleared when a storage reference for the particular event timer 186 is completed. An event time accumulator 190 accumulates the total time that requests are outstanding for any active token signals returned within an interval. Event time accumulator 190 is cleared for each new interval. An event time adder 188 adds an event timer value to the event time accumulator value. When an interval is complete, an event time register is enabled to load the value from event time accumulator 190. The value loaded into event time register 192 is passed to the event time PMC as will be further described. In an alternate embodiment, one event timer may be included which would only time one event at a time even though multiple events may occur.

Further logic may be provided to utilize the data calculated by event counter and timer logic unit 74. For example, output from event timers 186 may be further utilized to provide a mapping interrupt. A mapping interrupt may be set to occur after an event timer or event time accumulator has exceeded a predetermined threshold. When an interrupt is issued, the data address and instruction address of the storage event which caused the threshold to be exceeded can be captured and stored in the same manner as event times and counts are stored. The captured addresses may be processed and utilized to display a histogram which shows the addresses that statistically require the most time for processing.

In another example, the logic may be enhanced to capture the instruction address and data address of individual storage events. To capture these addresses, an interrupt in generated every N storage events where N is a programmable value that is utilized to reduce the frequency of interrupts. This interrupt causes the hardware to capture the storage address, instruction address and the contents of the event timer associated with the storage request that returned the token. The data gathered by this interrupt may be utilized to determine the minimum and maximum times for events in each interval. In addition to the interrupts illustrated, other interrupts may be generated within event counters and timers 74 to capture data at a particular time. For example, interrupts may be set to capture the shortest or longest time for an event for hardware and software debugging.

Figure 9:
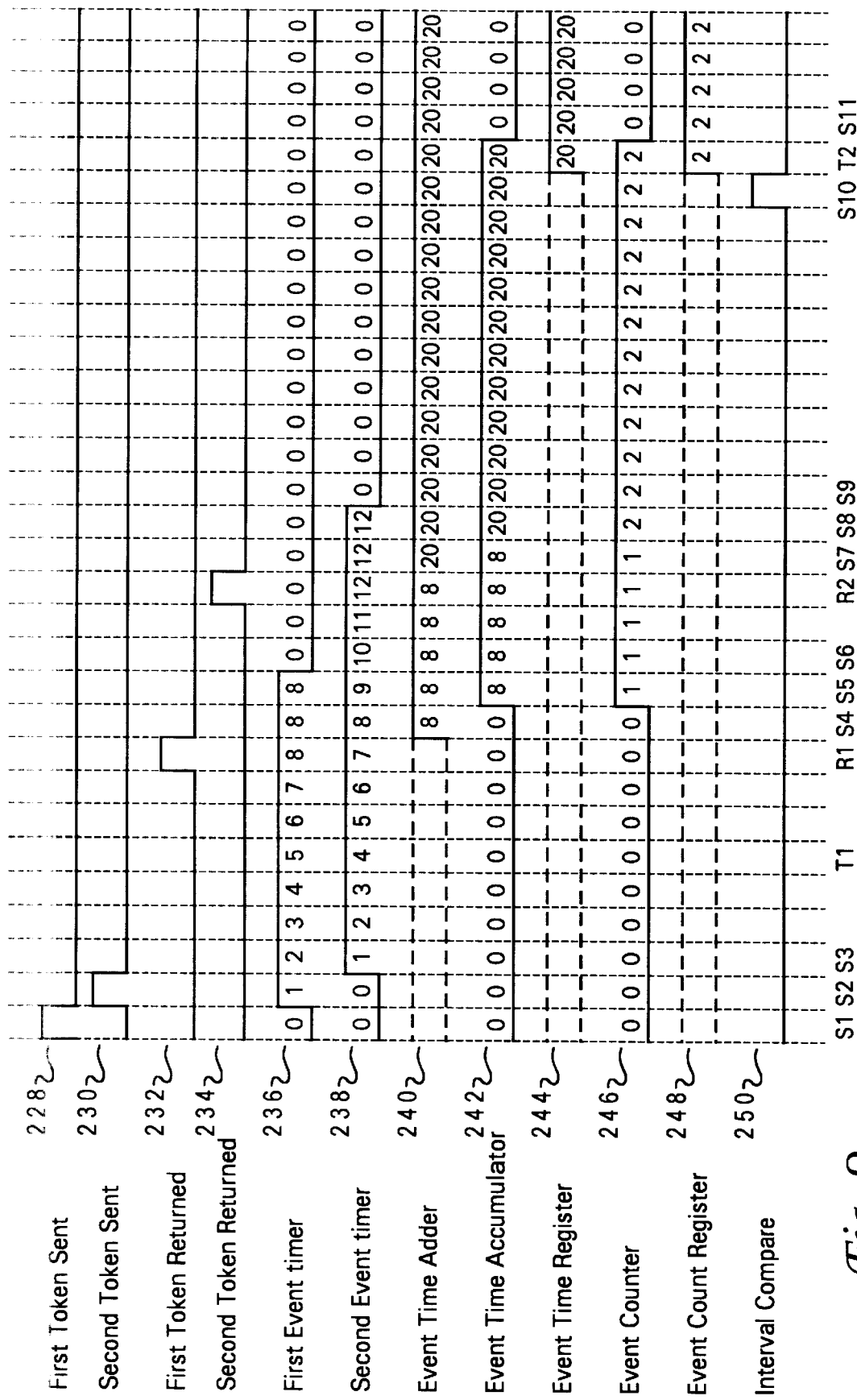
FIG. 9 illustrates a timing diagram representation as an example of the functions of event timer and counter logic according to the method and system of the present invention.

Referring now to FIG. 9, there is illustrated a timing diagram representation as an example of the functions of event timer and counter logic according to the method and system of the present invention. In the example, a first storage reference and first token signal are sent out at time=s1 as depicted at reference numeral 228. At time=s2, a first event timer is started as illustrated at reference numeral 236. In addition, a second storage reference and second token signal are sent out at time=s2 as depicted at reference numeral 230. At time=s3, a second event timer is started as illustrated at reference numeral 238.

At a time=r1, a first token signal is returned with the first storage reference as illustrated at reference numeral 232. At time=s4, the first event timer is selected for input to the event time adder. Next at time=s5, the event time accumulator illustrated at reference numeral 242 is enabled to receive the time value from the event time adder depicted at reference numeral 240. The event timer adder comprises the total time from when the first token signal is sent until the first token signal returns. In addition at time=s5, the event counter is incremented as depicted at reference numeral 246. Thereafter, at time=s6, the first event timer illustrated at reference numeral 236 is cleared.

At a time=r2, before the next time interval at time=t2, the second token signal is returned with the second storage reference as illustrated at reference numeral 234. At time=s7, the second event timer is selected for input to event timer adder. Thereafter, at time=s8, the event time accumulator illustrated at reference numeral 242 is enabled to receive the time value from the event time adder depicted at reference numeral 240, which comprises the total time for the first token signal added to the total time for the second token signal. In addition, at time=s8, the event counter is incremented again as depicted at reference numeral 246. Next, at time=s9, the second event timer illustrated at reference numeral 238 is cleared.

At time=s10, the end of time interval T0 is reached and the interval compare outputs a high signal. Thereafter, at the start of time interval T1, the event counter value is loaded into event counter register as illustrated at reference numeral 248. In addition, the event time accumulator value is loaded into the event time register as depicted at reference numeral 244. The event counter and event time accumulator are thereafter cleared at time=s11. Furthermore, the event timers and event counter now collect data for the path and condition selected in time interval T1.

Token Conditioning

In addition to conditioning a token signal through the token enable logic unit setting, token signals may be preconditioned, post conditioned, or event conditioned through additional logic. A token signal is preconditioned by only allowing a token signal to be sent with data requests which meet a particular set of predetermined criteria. A token signal is post conditioned by only receiving token signals at a processor which have encountered predetermined criteria. Moreover, token signals may be conditioned by events which are occuring while the token signal is attached to a data request. For example, a token signal may be conditioned such that the event timer for the token signal is only enabled when the processor pipeline is stalled. By incrementing event timers only during pipeline stalls, the time in the event timers would reflect the storage latency due to pipeline stalling that causes a performance loss in the processor. In the same manner, event timers 186 may be specialized to monitor other latency times.

Figure 10:
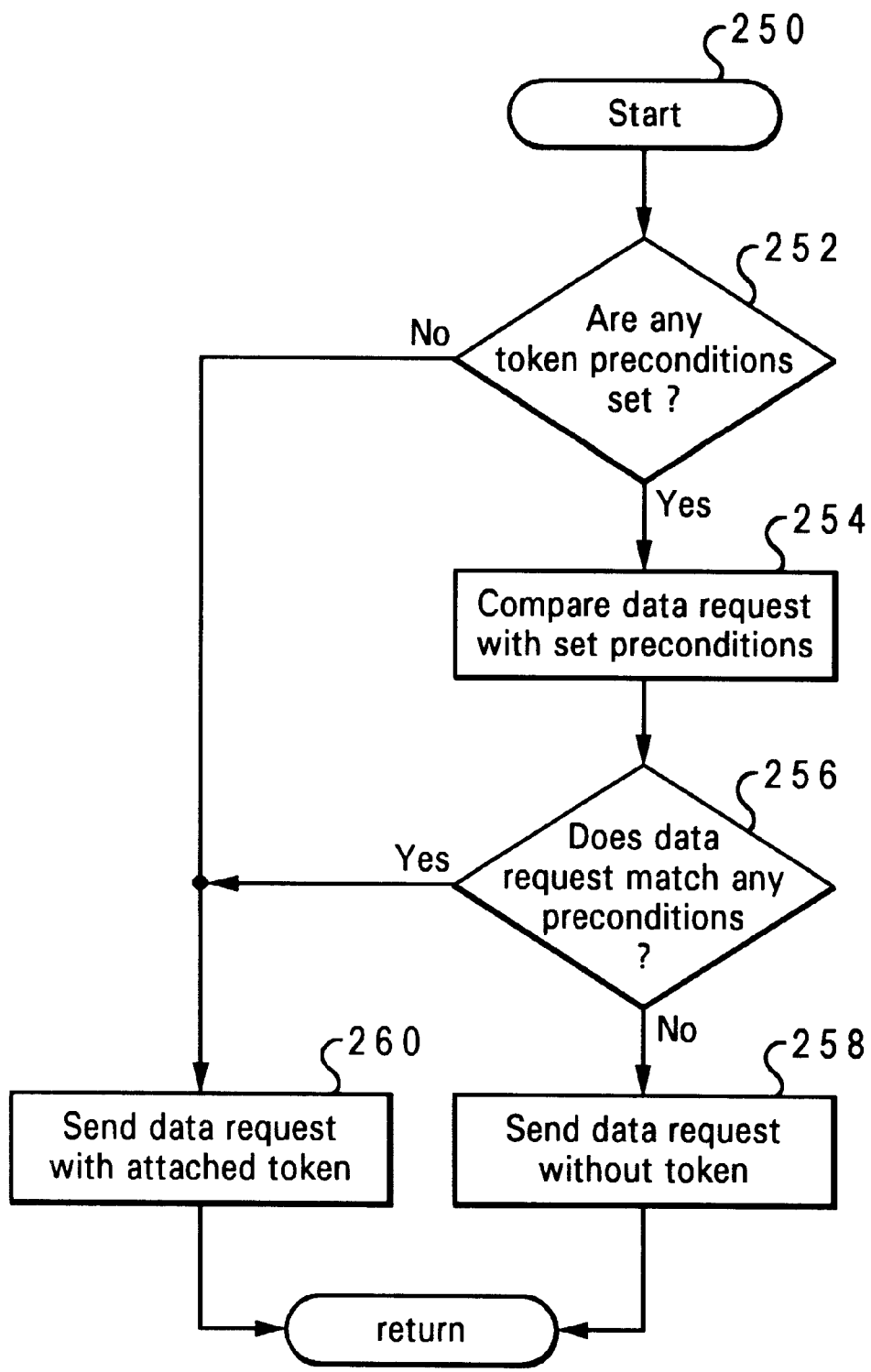
FIG. 10 is a high level logic flowchart depicting a process for preconditioning tokens according to the method and system of the present invention.

Referring now to FIG. 10, there is depicted a high level logic flowchart of a process executed within a processor for preconditioning a token signals with a data request. An option is provided in monitoring the performance of the data processing system to only monitor the data processing system for data requests meeting a set of conditions prior to being sent. For example, a processor can be set to only send out tokens with load requests and not store requests. Or, for example, a processor can be set to only send out token signals when operating in a processor state, such as a privilege state, or a user state. By preconditioning a token signal to only be sent with particular types of data requests, the conditions under which a token signal may be returned are further narrowed.

The process for determining whether or not to send out a token signal starts at block 250 and passes to block 252. Block 252 depicts the determination of whether or not there is a precondition set. If there are not any preconditions set, the process passes to block 260. Block 260 illustrates the attachment of a token signal with the data request and thereafter the process returns. However, if there are preconditions set, the process passes to block 254.

Block 254 depicts the comparison of the data request with the preconditions set. Thereafter, block 256 illustrates a determination of whether or not the data request matches all preconditions. If there is a match, the process proceeds to block 260. However, if the data request does not match all preconditions set, the process passes to block 258. Block 258 depicts the sending of the data request without a token signal attached, whereafter the process returns. These preconditioning steps are preferably implemented within additional logic.

Performance Data Accumulation

Figure 11:
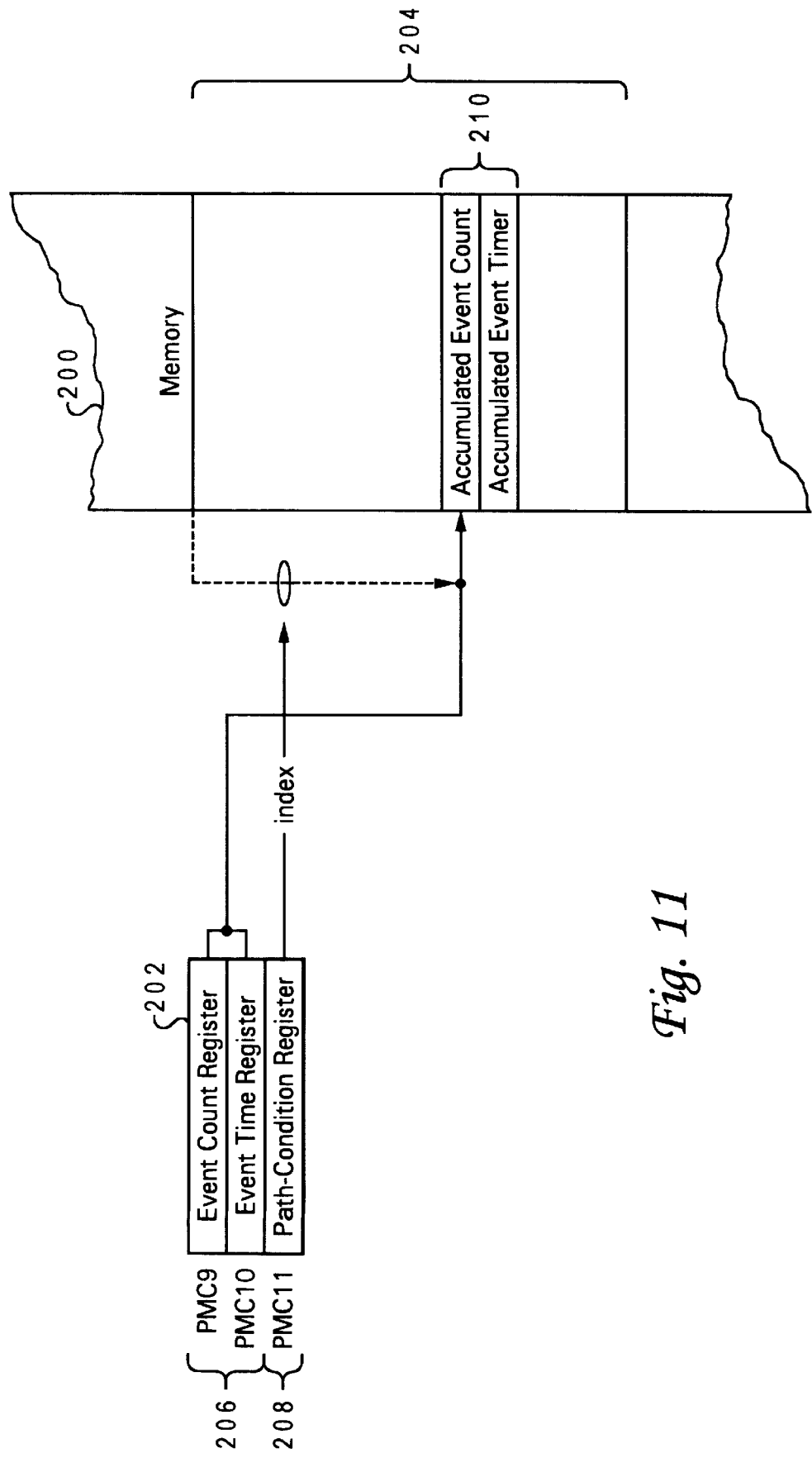
FIG. 11 illustrates a detailed block diagram representation of a performance data storage area.

Referring now to FIG. 11, there is depicted a block diagram representation of performance data accumulation in memory 200 according to the method and system of the present invention. From the PMC interrupt generated at the end of each interval, as illustrated in FIG. 4, interrupt software is evoked which utilizes the path-condition counter value as an index into a storage PMC accumulation area 204 within a memory 200 which may accumulate data for all processors. In alternate, a storage PMC accumulation area 204 may be distinguished for data accumulation from each processor. As illustrated, at reference numeral 208, the path-condition register which holds the value from the path-condition counter indexes to a particular storage PMC value within PMC accumulation area 204. At the particular storage PMC value, the values from the event counter register and event time register, as illustrated at reference numeral 206, are accumulated and stored at accumulated event count and accumulated event timer as illustrated at reference numeral 210. The data in memory 204 may be further gathered within the system and compiled for display or utilized by the service processor to increase the performance of the data processing system.

In addition to accumulating the times and number of events for a particular path and condition, a minimum time and maximum time for the path and condition may also be calculated and stored. In addition, it may be preferable to store the times as a distribution of times gathered such that a histogram or other graphical tool may be utilized to display the latency time gathered for the particular path and condition. In addition, as previously discussed, the data address and instruction address associated with a data request may be stored with a path and condition when a token is returned with the data request.

Figure 12:
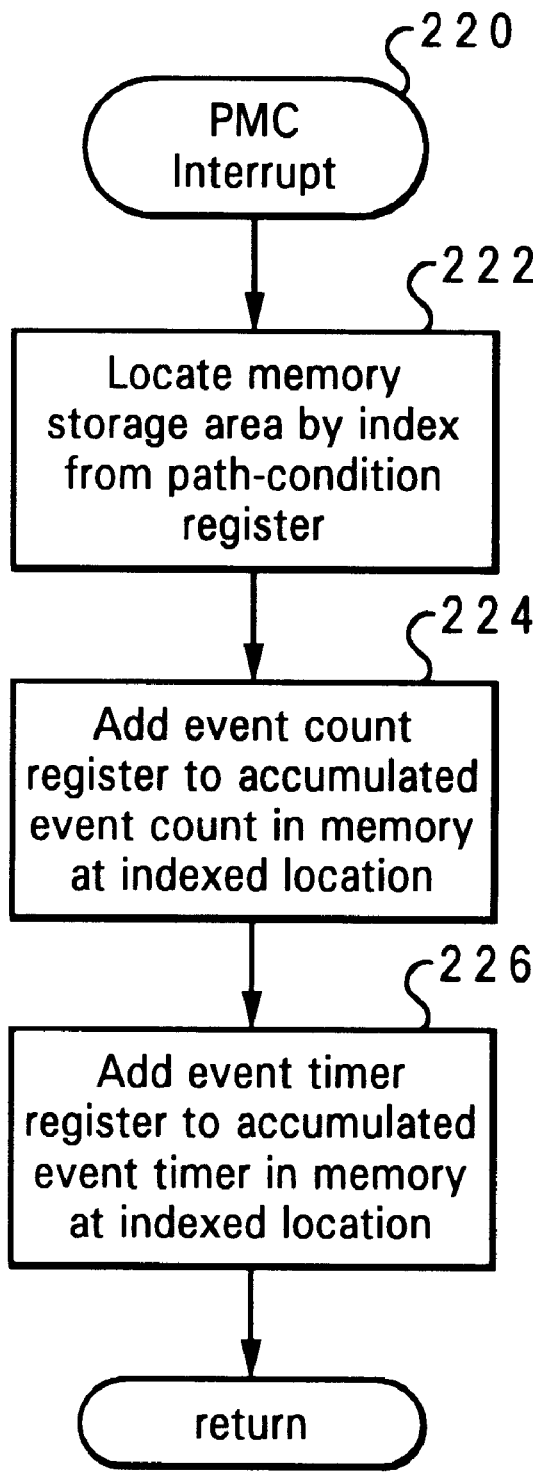
FIG. 12 is a high level logic flowchart depicting a process for storing data in the performance data storage area as illustrated in FIG. 11.

Referring now to FIG. 12, there is illustrated a high level logic flowchart depicting a process for storing data in the performance data storage area executed when a PMC interrupt is generated according to the method and system of the present invention. At a PMC interrupt, the process starts, as illustrated at block 220. Thereafter, the process passes to block 222. Block 222 depicts locating a particular memory storage location with an index comprising the values from the path-condition register. Thereafter, block 224 illustrates the addition of the event counter register value to the accumulated event count in memory at the indexed memory location. Next, block 226 depicts adding the event timer register value to the accumulated event timer in memory at the indexed memory location. Thereafter, the process returns.

Synchronization

With reference now to FIG. 13, as previously described, there is a block diagram representation of logic utilized to control passing of a token dependent upon the path and condition enabled in token enable logic 72. In a preferred method of synchronization, an active token is passed from a processor or processors to each cache hierarchy unit in the path of the processor. When the token is received, the interval counter in the token enable logic is enabled to start counting a first interval.

As depicted in FIG. 13, a latch is initially reset to "0" which signifies operation in synchronization mode. When the first token input reaches each chip, multiplexer 234 is enabled to output the token actively to the next chip in the path. Therafter, after a delay, latch 232 switches to "1" and operates in normal mode. Preferably, latch 232 is only reset at power up, however may be reset under other 35 conditions.

Figure 14:
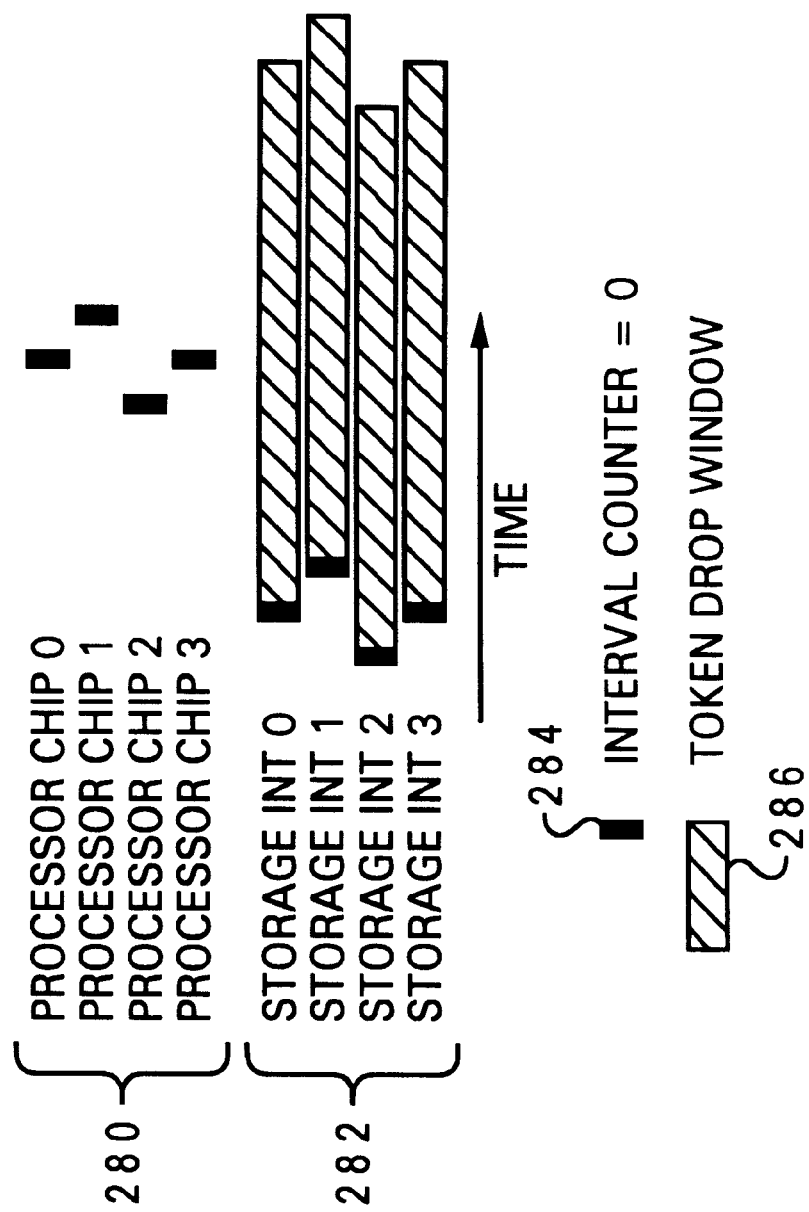
FIG. 14 depicts a pictorial illustration of a window during which tokens are dropped.

Referring now to FIG. 14, there is illustrated a pictorial illustration of a window during which tokens are dropped. By the token passing method of synchronizing interval counters, a delay is associated with passing the token to each chip. Therefore, the interval counter for each chip will not start at exactly the same time which could allow tokens from previous intervals to be returned in a new interval. However, a token drop window is utilized within each interval to ensure that tokens from previous intervals are not returned in a new interval.

As depicted in FIG. 14, processors 0, 1, 2 and 3, as depicted at reference numeral 280 start a new interval as depicted by graphical indicator 284. Storage interface chips include a drop token window as depicted by graphical indicator 286, during which all tokens are dropped. Preferably, storage interface chips 282 start a new interval prior to processor chips 280 in order to ensure that tokens are dropped prior to the start of a new interval. In addition, it is preferable that processor chips 280 start a new interval within the token drop window.

In an example, for a 150 Mhz system clock with the 24 bit interval timer, an interval of approximately 112 msec is provided. In the example, the skew between clock cycles due to delays is expected to be no more than 16 clock cycles. A token drop window is determined to be 64 clock cycles. Thereby, the lower 6 bits of the interval counter which are not compared with the drop token comparator are utilized to provide a token drop window time. In addition, it is preferable that the interval counters within processors be preset to 32 for the present example in order that the processors switch to new intervals well within the token drop window and that the tokens have already been dropped.

While the invention has been particularly shown and described with reference to a preferred embodiment, it will be understood by those skilled in the art that various changes in form and detail may be made therein without departing from the spirit and scope of the invention. For example, while the invention has been illustrated where tokens are passed primarily to and from processors through storage interface chips, in alternate embodiments, tokens may be passed through all data storage elements within the data processing system without departing from the spirit and scope of the invention.

What is claimed is:

1. A method of monitoring the performance of a data processing system in processing data requests, said data processing system processing data requests within a multilevel memory hierarchy, said method comprising the steps of:
   passing at least one token signal attached to a data request along a particular path within said multilevel memory hierarchy; and
   storing a time duration for said token signal to completely pass along said particular path if expected conditions are encountered along said particular path within said multilevel memory hierarchy, such that the performance of a data processing system requesting data along said particular path under said expected conditions is determined and is available for subsequent performance monitoring.

2. The method of monitoring the performance of a data processing system in processing data requests according to claim 1, said method further comprising the step of:
   synchronizing a plurality of performance controllers included within said data processing system, wherein said plurality of performance controllers determine if said particular path and said expected conditions are encountered.

3. The method of monitoring the performance of a data processing system in processing data requests according to claim 2, said step of synchronizing a plurality of performance controllers included within said data processing system, wherein said plurality of performance controllers determines if said particular path and said expected conditions are encountered, further comprising the step of:
   initializing an interval limit and a path-condition limit within each of said plurality of performance controllers.

4. The method of monitoring the performance of a data processing system in processing data requests according to claim 2, said step of synchronizing a plurality of performance controllers included within said data processing system, wherein said plurality of performance controllers determine if said particular path and said expected conditions are encountered, further comprising the step of:
   enabling interval counters within each of said plurality of performance controllers to begin incrementing.

5. The method of monitoring the performance of a data processing system in processing data requests according to claim 4, said step of enabling interval counters within each of said plurality of performance controllers to begin incrementing, further comprising the step of:
   passing a first token signal to each of said plurality of performance controllers wherein said first token signal enables each of said interval counters to begin incrementing.

6. The method of monitoring the performance of a data processing system in processing data requests according to claim 4, said step of enabling interval counters within each of said plurality of performance controllers to begin incrementing further comprising the step of:
   presetting said interval counters within each of said plurality of performance controllers to a predetermined value prior to enabling said interval counters.

7. The method of monitoring the performance of a data processing system in processing data requests according to claim 1, said method further comprising the step of:
   selecting said particular path and said expected conditions for an interval of time during which said token signal is being passed.

8. The method of monitoring the performance of a data processing system in processing data requests according to claim 7, said step of selecting said particular path and said expected conditions for an interval of time during which said token signal is being passed further comprising the step of:
   determining said particular path and said expected conditions by a path-condition value within each of a plurality of performance controllers, wherein each of said plurality of performance controllers is contained within a unit of said data processing system.

9. The method of monitoring the performance of a data processing system in processing data requests according to claim 8, said step of determining said particular path and said expected conditions by a path-condition value within each of a plurality of performance controllers, wherein each of said plurality of performance controllers is contained within a unit of said data processing system further comprising the step of:
   decoding said path-condition value within each of said plurality of performance controllers.

10. The method of monitoring the performance of a data processing system in processing data requests according to claim 8, said step of determining said particular path and said expected conditions by a path-condition value within each of a plurality of performance controllers, wherein each of said plurality of performance controllers is contained within a unit of said data processing system further comprising the step of:

incrementing a path-condition counter for each said interval of time, wherein said path-condition counter for each said interval of time contains a path-condition value.

11. The method of monitoring the performance of a data processing system in processing data requests according to claim 10, said step of incrementing a path-condition counter for each said interval of time, wherein said path-condition counter for each said interval of time contains a path-condition value further comprising the steps of:

comparing said path-condition counter with a path-condition limit; and in response to said path-condition counter exceeding said path-condition limit, clearing said path-condition counter.

12. The method of monitoring the performance of a data processing system in processing data requests according to claim 7, said step of selecting said particular path and said expected conditions for an interval of time during which said token signal is being passed further comprising the steps of:

continuously incrementing each of a plurality of interval counters within said data processing system;

comparing each of said plurality of interval counters with an interval limit associated therewith; and clearing each of said plurality of interval counters and triggering a path-condition counter associated therewith to increment, in response to said interval counter equaling said interval limit, wherein a new interval of time is started on each of said plurality of interval counters.

13. The method of monitoring the performance of a data processing system in processing data requests according to claim 12, said method further comprising the step of:

outputting an interval interrupt to indicate that said interval of time is complete within a processor unit of said data processing system.

14. The method of monitoring the performance of a data processing system in processing data requests according to claim 12, said method further comprising the step of:

outputting a token drop signal to indicate to said performance controllers within said units of said multilevel memory hierarchy to drop any said token signals.

15. The method of monitoring the performance of a data processing system in processing data requests according to claim 1, said step of passing at least one token signal attached to a data request along a particular path within said multilevel memory hierarchy further comprising the step of:

passing said token signal attached to said data request from a processor unit to said multilevel memory hierarchy;

receiving said requested data at said processor unit from said multilevel memory hierarchy; and receiving an active token signal at said processor unit with said requested data if said data request traversed said particular path and encountered said expected conditions within said multilevel memory hierarchy.

16. The method of monitoring the performance of a data processing system in processing data requests according to claim 15, said method further comprising the steps of:

checking if any preconditions for sending a token signal have been set; and only sending a token signal with a data request if the data request meets said preconditions set.

17. The method of monitoring the performance of a data processing system in processing data requests according to claim 1, said step of storing a time duration for said token signal to completely pass along said particular path if expected conditions are encountered along said particular path within said multilevel memory hierarchy further comprising the steps of:

starting an event timer for each data request sent with a token signal attached;

capturing the time on said event timer when said data request is completed if said token signal is returned active with said data request;

storing said captured time in association with said particular path and said expected conditions.

18. The method of monitoring the performance of a data processing system in processing data requests according to claim 17, said step of storing said captured time in association with said particular path and said expected conditions further comprising the steps of:

accumulating the total number of token signals returned during an interval of time;

adding each event timer value to a total event time for said interval of time where a particular path and expected conditions are monitored within said interval of time; and accumulating said total event time and said total number of token signals returned in association with said particular path and said expected conditions at the end of said interval of time.

19. The method of monitoring the performance of a data processing system in processing data requests according to claim 17, said method further comprising the steps of:

comparing said event timer with a threshold register value;

outputting a mapping interrupt when the event timer exceeds said threshold register value and said token signal is returned active;

capturing the data address and instructions address for said data request in response to said mapping interrupt; and storing said captured data address and instruction address in associated with said captured time.

20. A system for monitoring the performance of a data processing system in processing data requests, said data processing system processing data requests within a multilevel memory hierarchy, said system comprising:

means for passing at least one token signal attached to a data request along a particular path within said multilevel memory hierarchy; and means for storing a time duration for said token signal to completely pass along said particular path if expected conditions are encountered along said particular path within said multilevel memory hierarchy, such that the performance of a data processing system requesting data along said particular path under said expected conditions is determined and is available for subsequent performance monitoring.

21. The system for monitoring the performance of a data processing system in processing data requests according to claim 20, said system further comprising:

means for synchronizing a plurality of performance controllers included within said data processing system, wherein said plurality of performance controllers determine if said particular path and said expected conditions are encountered.

22. The system for monitoring the performance of a data processing system in processing data requests according to claim 21, said means for synchronizing a plurality of performance controllers included within said data processing system, wherein said plurality of performance controllers determines if said particular path and said expected conditions are encountered, further comprising:

means for initializing an interval limit and a path-condition limit within each of said plurality of performance controllers.

23. The system for monitoring the performance of a data processing system in processing data requests according to claim 21, said means for synchronizing a plurality of performance controllers included within said data processing system, wherein said plurality of performance controllers determine if said particular path and said expected conditions are encountered, further comprising:

means for enabling interval counters within each of said plurality of performance controllers to begin incrementing.

24. The system for monitoring the performance of a data processing system in processing data requests according to claim 23, said means for enabling interval counters within each of said plurality of performance controllers to begin incrementing, further comprising:

means for passing a first token signal to each of said plurality of performance controllers wherein said first token signal enables each of said interval counters to begin incrementing.

25. The system for monitoring the performance of a data processing system in processing data requests according to claim 23, said means for enabling interval counters within each of said plurality of performance controllers to begin incrementing further comprising:

means for presetting said interval counters within each of said plurality of performance controllers to a predetermined value prior to enabling said interval counters.

26. The system for monitoring the performance of a data processing system in processing data requests according to claim 20, said system further comprising:

means for selecting said particular path and said expected conditions for an interval of time during which said token signal is being passed.

27. The system for monitoring the performance of a data processing system in processing data requests according to claim 26, said means for selecting said particular path and said expected conditions for an interval of time during which said token signal is being passed further comprising:

a path-condition counter within each of a plurality of performance controllers which is utilized to determine said particular path and said expected conditions, wherein each of said plurality of performance controllers is contained within a unit of said data processing system.

28. The system for monitoring the performance of a data processing system in processing data requests according to claim 27, said system further comprising:

a path-condition decoder for determining said particular path and said expected conditions from said path-condition counter value within each of said plurality of performance controllers.

29. The system for monitoring the performance of a data processing system in processing data requests according to claim 28, said system further comprising:

means for comparing said decoded particular path and expected conditions with the actual path and actual conditions encountered by said data request;

means for dropping a token signal associated with said data request from a performance controller if said decoded particular path and expected conditions are not encountered by said data request.

30. The system for monitoring the performance of a data processing system in processing data requests according to claim 27, said system further comprising:

means for incrementing a path-condition counter for each said interval of time, wherein said path-condition counter for each said interval of time contains a path-condition value.

31. The system for monitoring the performance of a data processing system in processing data requests according to claim 30, said means for incrementing a path-condition counter for each said interval of time, wherein said path-condition counter for each said interval of time contains a path-condition value further comprising:

means for comparing said path-condition counter with a path-condition limit; and means for clearing said path-condition counter, in response to said path-condition counter exceeding said path-condition limit.

32. The system for monitoring the performance of a data processing system in processing data requests according to claim 26, said means for selecting said particular path and said expected conditions for an interval of time during which said token signal is being passed further comprising:

a system clock continuously incrementing each of a plurality of interval counters within said data processing system;

a comparitor for comparing each of said plurality of interval counters with an interval limit associated therewith; and means for clearing each of said plurality of interval counters and triggering a path-condition counter associated therewith to increment, in response to said interval counter equaling said interval limit, wherein a new interval of time is started on each of said plurality of interval counters.

33. The system for monitoring the performance of a data processing system in processing data requests according to claim 32, wherein said comparitor outputs an interval interrupt to indicate that said interval of time is complete within a processor unit of said data processing system.

34. The system for monitoring the performance of a data processing system in processing data requests according to claim 32, wherein said comparitor outputs a token drop signal to indicate to said performance controllers within said units of said multilevel memory hierarchy to drop any said token signals.

35. The system for monitoring the performance of a data processing system in processing data requests according to claim 34, wherein said all token signals are dropped during a token drop window of time.

36. The system for monitoring the performance of a data processing system in processing data requests according to claim 20, said means for passing at least one token signal attached to a data request along a particular path within said multilevel memory hierarchy further comprising:

means for passing said token signal attached to said data request from a processor unit to said multilevel memory hierarchy;

means for receiving said requested data at said processor unit from said multilevel memory hierarchy; and means for receiving an active token signal at said processor unit with said requested data if said data request traversed said particular path and encountered said expected conditions within said multilevel memory hierarchy.

37. The system for monitoring the performance of a data processing system in processing data requests according to claim 36, said system further comprising:

means for checking if any preconditions for sending a token signal have been set; and means for only sending a token signal with a data request if the data request meets said preconditions set.

38. The system for monitoring the performance of a data processing system in processing data requests according to claim 36, said system further comprising:

means for checking if any postconditions for receiving a token signal have been set;

means for only receiving a token signal with a data request if the data request meets said postconditions set.

39. The system for monitoring the performance of a data processing system in processing data requests according to claim 20, said means for storing a time duration for said token signal to completely pass along said particular path if expected conditions are encountered along said particular path within said multilevel memory hierarchy further comprising:

means for starting an event timer for each data request sent with a token signal attached;

means for capturing the time on said event timer when said data request is completed if said token signal is returned active with said data request;

means for storing said captured time in association with said particular path and said expected conditions.

40. The system for monitoring the performance of a data processing system in processing data requests according to claim 39, said means for starting an event timer for each data request sent with a token signal attached further comprising:

means for controlling the start of said event timer for a data request sent with a token attached when a particular event occurs to said data request.

41. The system for monitoring the performance of a data processing system in processing data requests according to claim 39, said means for storing said captured time in association with said particular path and said expected conditions further comprising:

means for accumulating the total number of token signals returned during an interval of time;

means for adding each event timer value to a total event time for said interval of time where a particular path and expected conditions are monitored within said interval of time; and a particular data storage area for accumulating said total event time and said total number of token signals returned in association with said particular path and said expected conditions at the end of each said interval of time.

42. The system for monitoring the performance of a data processing system in processing data requests according to claim 39, said system further comprising:

means for comparing said event timer with a threshold register value;

means for outputting a mapping interrupt when the event timer exceeds said threshold register value and said token signal is returned active;

means for capturing the data address and instructions address for said data request in response to said mapping interrupt; and a data storage area for storing said captured data address and instruction address in associated with said captured time.

43. A program product for monitoring the performance of a data processing system, said program product comprising:

a data processing system usable medium;

a performance controller encoded with said data processing system usable medium that, in response to receiving an active token signal with requested data, stores a time duration for said token signal to completely pass along a particular path if expected conditions are encountered along said particular path.

44. The program product according to claim 43, wherein said performance controller:

passes said token signal attached to said data request from a processor unit to said multilevel memory hierarchy;

receives said requested data at said processor unit from said multilevel memory hierarchy; and receives an active token signal at said processor unit with said requested data if said data request traversed said particular path and encountered said expected conditions within said multilevel memory hierarchy.

45. The program product of claim 43, wherein said performance controller:

starts an event timer for each data request sent with a token signal attached;

captures the time on said event timer when said data request is completed if said token signal is returned active with said data request;

stores said captured time in association with said particular path and said expected conditions.

46. The program product of claim 45, wherein said performance controller:

accumulates the total number of token signals returned during an interval of time;

adds each event timer value to a total event time for said interval of time where a particular path and expected conditions are monitored within said interval of time.

* * * * *